United States Patent
Soderberg et al.

[11] Patent Number: 5,365,988
[45] Date of Patent: Nov. 22, 1994

[54] PNEUMATIC TIRE WITH FABRIC OVERLAY

[75] Inventors: Roger H. Soderberg; Michael J. Chekan, both of LaGrange, Ga.

[73] Assignee: Milliken Research Corporation, Spartanburg, S.C.

[21] Appl. No.: 56,438

[22] Filed: Mar. 1, 1993

Related U.S. Application Data

[63] Continuation-in-part of Ser. No. 846,135, Mar. 5, 1992, abandoned.

[51] Int. Cl.5 .......................... B60C 9/00; B60C 9/18
[52] U.S. Cl. ............................ 152/527; 152/526; 152/536
[58] Field of Search ............... 152/451, 526, 527, 536, 152/563

[56] References Cited

U.S. PATENT DOCUMENTS

| | | | |
|---|---|---|---|
| 3,786,851 | 1/1974 | Mirtain et al. | 152/527 |
| 3,850,219 | 11/1974 | Snyder | 152/536 X |
| 4,135,565 | 1/1979 | van der Burg | 152/527 |
| 4,284,117 | 8/1981 | Poque et al. | 152/527 |
| 4,724,881 | 2/1988 | Poque et al. | 152/527 |
| 4,739,814 | 4/1988 | Berczi et al. | 152/527 |
| 5,115,853 | 5/1992 | Oare et al. | 152/527 |

FOREIGN PATENT DOCUMENTS

| | | | |
|---|---|---|---|
| 1035682 | 8/1978 | Canada | 152/536 |
| 1586370 | 1/1970 | France | 152/527 |

*Primary Examiner*—Caleb Weston
*Assistant Examiner*—Adrienne C. Johnstone
*Attorney, Agent, or Firm*—Terry T. Moyer; Earle R. Marden

[57] ABSTRACT

A pneumatic tire in which the steel belt ply or plies are enclosed in at least two wraps of a cap ply fabric which is wider than the steel belt ply and which is adhered to the belt ply as well as the tire cord outside of the belt ply.

8 Claims, 2 Drawing Sheets

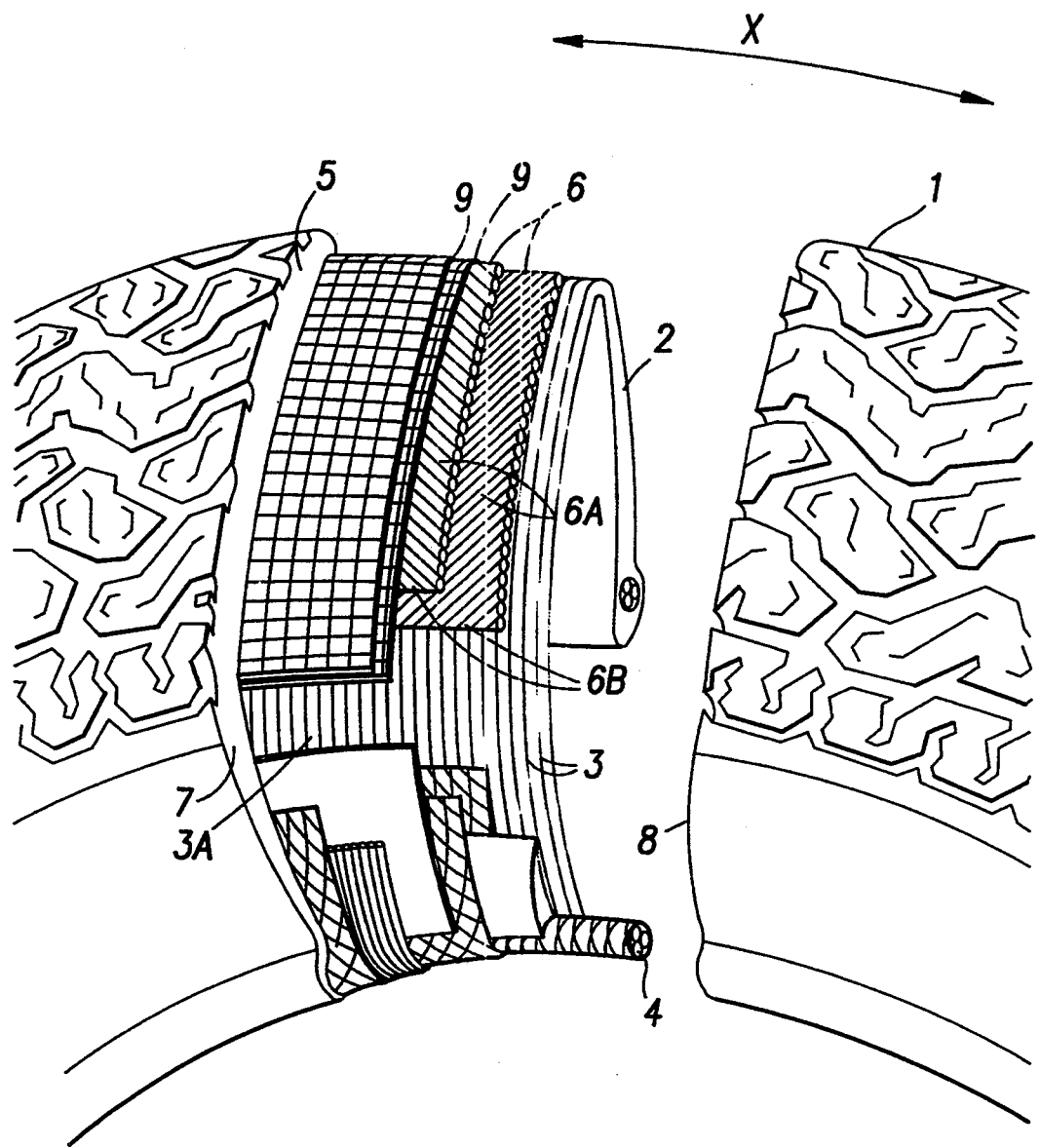
FIG. -1-

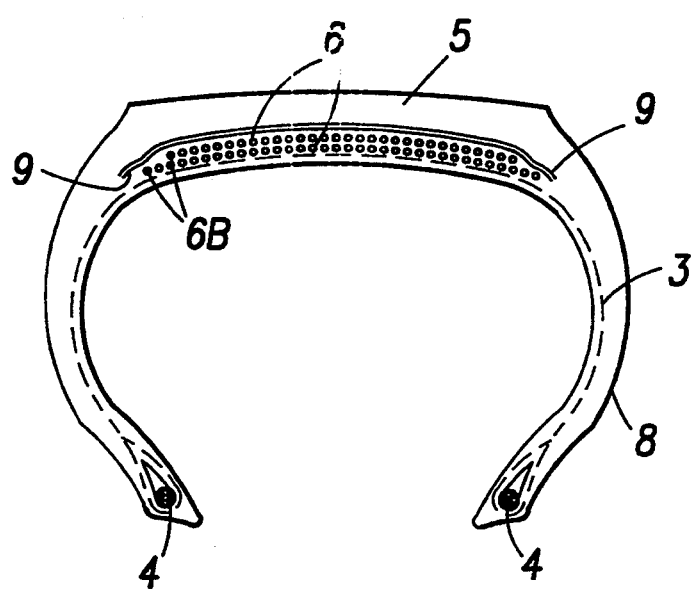
FIG. -2-

PNEUMATIC TIRE WITH FABRIC OVERLAY

CROSS-REFERENCES TO RELATED APPLICATIONS

This is a continuation-in-part of application Ser. No. 07/846,135 filed Mar. 5, 1992 of Roger Hendricks Soderberg and Michael John Chekan for IMPROVED PNEUMATIC TIRE now abandoned.

BACKGROUND OF THE INVENTION

1. Field of the Invention

This invention relates to pneumatic tires and to fabrics for use in building pneumatic tires.

2. Description of the Related Art

At the present time most pneumatic tires for passenger vehicles are of the radial ply type as described below and fall into three classes namely SR, HR and VR which are tested to operate at speeds up to 180, 210 and over 210 kilometers per hour, respectively. Radial ply type passenger tires are in the main manufactured from a single or multiple carcass of substantially U-shaped section having metal beads at the inner perimeters of the walls. In such a radial ply tire construction the carcass is formed from a rubberized woven fabric having relatively inextensible reinforcing cords running transversely, i.e., radially, from bead to bead. A carcass constructed in this manner requires to be supported in the area of the tread. Commonly this support is provided by two or more steel cord belt plies extending around the outer periphery of the carcass and across the width of the tread. Such steel belt plies are relatively inextensible in the intended direction of rotation of the tire and include steel belt cords disposed parallel to that direction or at a low angle thereto. The belt plies act to restrict the movement of the tread and give the tire better road-holding properties.

In view of the severe speed tests mentioned above, technical difficulties have been encountered in incorporating steel belts into the tread area of the tire. One of the difficulties lies in ensuring good adhesion between the steel and the rubber. When first introduced such steel belted tires were susceptible to tread chunking at high speed due to temperature build-up causing the rubber to degrade to an extent which impaired the adhesion between the steel belt and the rubber tread. This breakdown was particularly prevalent at the edges of the steel belt where excessive temperature build-up takes place, leading to progressive adhesion failure and irregular and severe tread wear in the shoulder area of the tire.

Two solutions to the aforementioned problem have been proposed. The first solution comprises forming a secondary carcass over the steel belt plies using one or two plies of calendered RFL treated nylon tire cord extending circumferentially around the tire and across the surface of the steel belt and beyond the edges thereof. The tire cord is disposed with its relatively inextensible warp running around the perimeter of the steel belt in the intended direction of rotation of the tire. The addition of this tire cord is commonly known as a "cap-ply," "overlay" or "nylon cording." One example of this solution is disclosed in U. S. Pat. No. 4,284,117.

The second solution comprises utilizing two or more steel belt plies in which the edge of each ply is folded upon itself.

Both of the aforementioned solutions are expensive in that they utilize relatively large amounts of either calendered nylon cord or steel cord and, in the second solution, tire building problems can occur both in the folding of the steel belts and in the accurate positioning of each ply of the belt. Furthermore, both solutions inevitably result in a relatively heavy construction.

SUMMARY OF THE INVENTION

An object of the present invention is to obviate or mitigate the aforementioned disadvantages by providing a fabric for use in tire construction which provides improved stability, good mechanical and chemical adhesion, cost savings during tire building and a fabric weight saving without adversely affecting the properties of the tire in relation to ride comfort, noise and rolling resistance.

According to the present invention there is provided a fabric for use in tire building and comprising an open square construction having a tackified finish, a warp set in the range of 100 to 240 threads per decimeter and a weft set in the range of 32 to 100 threads per decimeter.

Preferably, the fabric is formed from yarns with counts in the range of 230 to 1400 decitex.

The fabric is applied as a multi-layer cap-ply extending and over the edges thereof to provide a plurality of unbroken wraps around the tire in the rolling direction/

Other objects and advantages of the invention will become readily apparent as the specification proceeds to describe the invention with reference to the accompanying drawings.

BRIEF DESCRIPTION OF THE DRAWINGS

FIG. 1 is a cut-away section of part of a pneumatic radial ply tire, and

FIG. 2 is a cross-sectional view of the radial tire shown in FIG. 1.

DESCRIPTION OF THE PREFERRED EMBODIMENT

Referring now to the drawings, a radial ply tire indicated generally at 1, comprises a carcass 2 formed from one or more plies of tire cord 3 terminating at the inner periphery of the tire in metal beads 4. The tire cord 3 is a rubberized woven fabric having its warps formed from relatively inextensible reinforcing cords, indicated generally at 3a. In the radial ply tire shown in FIG. 1 the carcass 2 is constructed so that the reinforcing cords are running substantially radially to the intended direction of rotation X of the tire 1. Support is provided to the carcass 2 in the area of the tread 5 of the tire by two or more steel cord belt plies 6. The belt plies 6 are formed with relatively inextensible steel cord reinforcing warps, indicated generally at 6A, which run in the intended direction of rotation X of the tire or, more usually, at a slight angle thereto. The belt plies 6 extend across the width of the tread 5 of the tire terminating in edges 6B in the shoulder portion 7 of the tire, i.e., the area where the tread 5 meets the side wall 8.

A cap ply consisting of a plurality of layers 9 of fabric wound a plurality of times around the steel cord belt plies 6 in the rolling direction of the tire 1 and extending over the edges 6B of the belt plies 6 is employed to reduce the unbalancing effect in the tire caused by the overlap splice. The fabric 9 has an open square construction and a tackified finish so that it will readily adhere to the belt and the carcass.

The cap ply fabric 9 may be manufactured by conventional weaving, leno weaving, or warp inlay and weft insertion knitting from untwisted, twisted, folded, or texturized rayon, nylon 6, nylon 66, polyester or aramid yarns having a yarn count between 230 and 1400 decitex. The warp may have a set in the range of 100 to 240 threads per decimeter and the weft a set in the range of 32 to 100 threads per decimeter. The weft should lie at right angles to the warp.

The fabric is approximately 15-30 centimeters wide with a thickness between 0.25 mm and 0.55 mm and has a tackified finish to facilitate adhesion during building. This tackified finish is achieved by coating the fabric with an aqueous blend of resin and rubber latices or, alternatively, with a solvent solution of an unvulcanized rubber compound.

In one specific example the shoulder cap fabric 9 is formed by plain weaving with a warp set of 160 threads per decimeter and a weft set of 40 threads per decimeter. The warp is a 460 decitex nylon yarn with a twist of 197 t.p.m. and the weft is 930 decitex nylon. The fabric is 0.40 mm thick and has a weight of 235 gm/m$^2$.

The use of the fabric according to the invention reduces the likelihood of a breakdown of adhesion occurring in the shoulder area of the tire due to the flexibility gradient provided by the square construction of the fabric. Furthermore, the open square construction improves the mechanical adhesion properties thereby providing a stable tire construction.

The present invention also provides for cost savings in that it reduces the weight of fabric in the tire and in particular reduces the requirement for calendered tire cord. It facilitates the tire building operation by use of the tackified finish and it enables a reduction in the overall weight and rolling resistance of the tire while not adversely affecting its ride comfort or noise level.

It can be seen that the unbalancing effect in the tire caused by the overlap splice has been reduced by wrapping two or even three times around the tire. This gives one or even two unbroken wraps of the cap ply fabric around the tire in its rolling direction. In order to do this without unacceptable bulk due to the thickness of the fabric, finer high tenacity yarns are used to reduce the thickness, and tighter weaving constructions are used to maintain acceptable tensile strength of the fabric. With proper selection of yarn size and construction a thinner light fabric is achieved. Due to the lightness of the fabric the imbalance effect of the overlap splice is reduced to an acceptable level. In addition, the lightness and thin gauge of the fabric also reduces the tire's weight and rolling resistance. By putting in numerous filling threads in the fabric, significant tensile strength is built up in the filling (across fabric) direction. With the multiple wrap of fabric being placed over the shoulder of the tire, on top of the steel belt edge, and extending partially down the side wall of the tire, the filling yarns firmly hold the belt edges down. This resists the centrifugal force at high speeds, plus turning stresses, which cause belt edge separation from the carcass of the tire and tire failure. Present cap ply fabrics of tire cord construction have virtually no filling threads (1 to 3 picks/inch) and the yarn is fine count spun rayon, cotton, or light high elongation synthetic yarn. None of the hold down forces came from the filling. Heavy tire cords, mostly of nylon, are wrapped over the belts and their edges in the rolling direction of the tire. The great strength of these cords, plus thermal shrinkage force generated by the cord attempting to shrink due to heat build up in the tire when running at high speed, are the means for holding the belt edges down.

The above-described embodiments are given for the purpose of illustration only. Improvements and modification may be made to those embodiments without departing from the scope of the invention.

We claim:

1. A pneumatic tire comprising: a carcass having at least one ply of tire cord, a belt having at least one belt ply extending circumferentially of the tire and a cap ply fabric over and in contact with said carcass, said cap ply being a fabric of open square weave construction and having a tackified finish, said open weave fabric having a warp set of about 100-240 threads per decimeter and a weft set of about 32-100 threads per decimeter, said cap ply fabric being an open weave fabric of a thickness of 0.25-0.55mm with the yarns having counts in the range of 230 to 1400 decitex, said cap ply fabric comprising a plurality of wraps of said open weave fabric covering said belt, being of a width greater than said belt and adhered to said belt and said carcass.

2. A tire according to claim 1 wherein the warp set is 160 threads per decimeter and the weft set is 40 threads per decimeter.

3. A tire according to claim 2 wherein the warp is nylon yarn having a count of 460 decitex and the weft is nylon yarn having a count of 930 decitex.

4. The tire of claim 3 wherein said tackified finish is a blend of resin and rubber latices.

5. The tire of claim 3 wherein said tackified finish is an unvulcanized rubber compound.

6. A tire according to claim 1 wherein said cap ply fabric is approximately 0.40 mm thick.

7. A tire according to claim 6 wherein the warp set is 160 threads per decimeter and the weft set is 40 threads per decimeter.

8. A tire according to claim 7 wherein the warp is nylon yarn having a count of 460 decitex and the weft is nylon yarn having a count of 930 decitex.

* * * * *